US007473155B1

(12) United States Patent
Klundt et al.

(10) Patent No.: US 7,473,155 B1
(45) Date of Patent: Jan. 6, 2009

(54) NOVELTY HAND-HELD OBJECT HOLDER

(75) Inventors: Kalvin Klundt, LaGrange, KY (US); Robert C. Auerbach, LaGrange, KY (US)

(73) Assignee: K & A Design, LLC, Louisville, KY (US)

( * ) Notice: Subject to any disclaimer, the term of this patent is extended or adjusted under 35 U.S.C. 154(b) by 351 days.

(21) Appl. No.: 11/458,133

(22) Filed: Jul. 18, 2006

(51) Int. Cl.
*A63H 5/00* (2006.01)
*A63H 33/00* (2006.01)
(52) U.S. Cl. ............................ 446/207; 446/73; 426/104
(58) Field of Classification Search ................ 446/207, 446/386, 71, 73, 75, 76, 134; 426/104, 134
See application file for complete search history.

(56) References Cited

U.S. PATENT DOCUMENTS

| | | | | |
|---|---|---|---|---|
| 6,062,940 A | * | 5/2000 | Bean | 446/193 |
| 6,129,606 A | * | 10/2000 | Yuen | 446/325 |
| 6,190,226 B1 | * | 2/2001 | Conconi | 446/73 |
| 6,399,126 B1 | * | 6/2002 | Weldon, Jr. | 426/134 |
| 6,402,580 B1 | * | 6/2002 | Coleman et al. | 446/72 |
| 6,645,030 B2 | * | 11/2003 | Coleman et al. | 446/73 |
| 6,884,447 B2 | * | 4/2005 | Baker | 426/104 |

\* cited by examiner

*Primary Examiner*—Kien T Nguyen
(74) *Attorney, Agent, or Firm*—Stites & Harbison, PLLC; David W. Nagle, Jr.

(57) ABSTRACT

A hand-held object holder includes an aesthetic component having an upper portion secured to a lower portion by a spring, such that the upper portion can wobble back and forth relative to the lower portion. A sound-generating component is secured to the aesthetic component, so that as the upper portion wobbles back and forth, a sound is generated. Finally, at the lower end of the aesthetic component, there is a coupling member for securing an object, such as a candy item, to the aesthetic component.

12 Claims, 4 Drawing Sheets

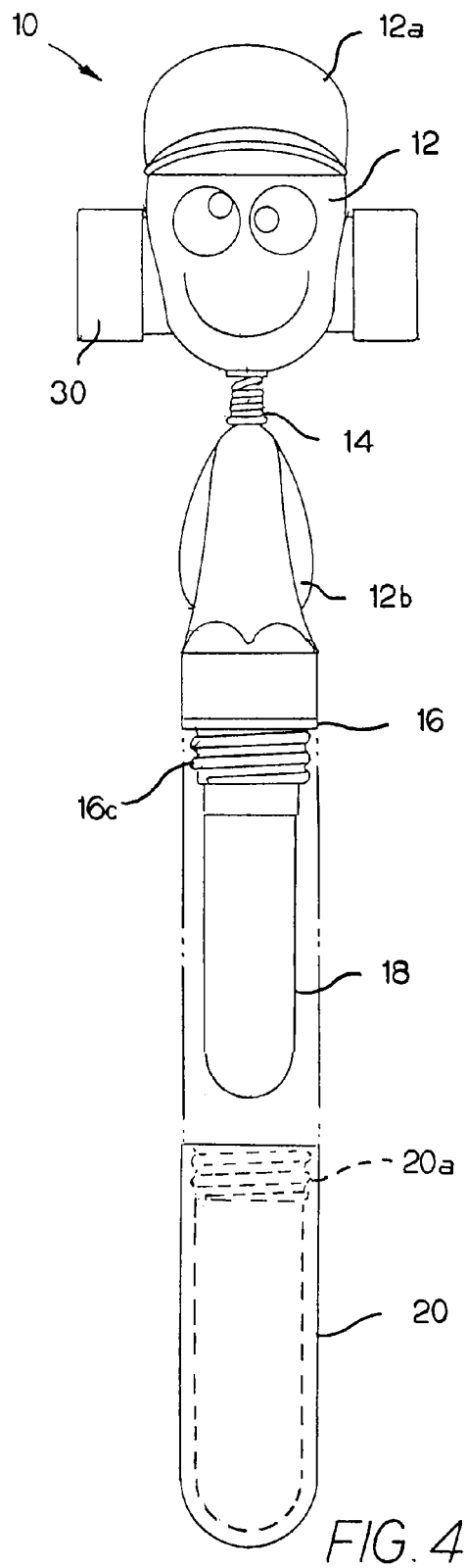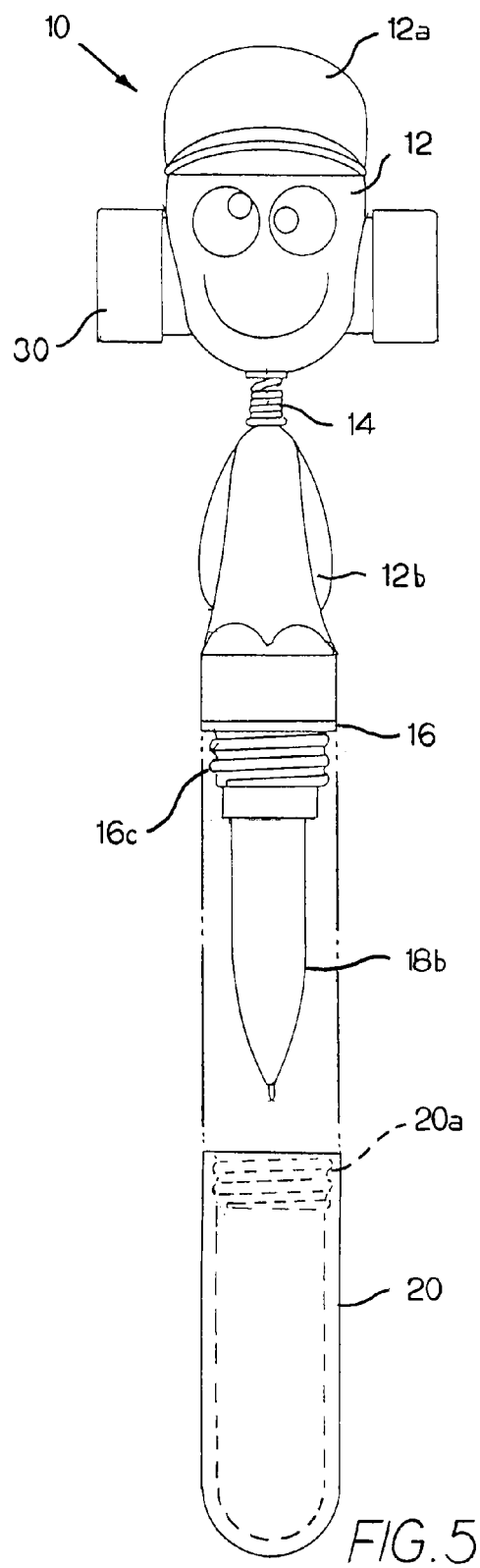

NOVELTY HAND-HELD OBJECT HOLDER

BACKGROUND OF THE INVENTION

The present invention relates to novelty and candy products designed primarily for children. Various such products are marketed through retail businesses, especially as "impulse items" that are displayed in checkout lanes or near the cashier. Such products must generate immediate consumer appeal and attract the attention of children in order to be commercially successful.

SUMMARY OF THE INVENTION

The present invention is a hand-held object holder that includes an aesthetic component having an upper portion secured to a lower portion by a spring, such that the upper portion can wobble back and forth relative to the lower portion. In one exemplary embodiment, the aesthetic component is in the form of a "cartoonish" character, with the lower portion taking the form of the body of the character, and the upper portion taking the form of the head of the character. As such, the aesthetic component is similar to a bobblehead doll, with the head of the character wobbling back and forth as the body is held and manipulated by an individual. A sound-generating component is secured to the aesthetic component, so that as the head wobbles back and forth, a sound is generated, for example, a high-pitched "giggle." Finally, at the lower end of the aesthetic component, there is a coupling member for securing an object, such as a candy item, to the aesthetic component. The resulting hand-held object holder is a novelty product with great consumer appeal, especially to children.

DESCRIPTION OF THE DRAWINGS

FIG. 4 illustrates the removal of the sheath to access the candy item of the exemplary hand-held object holder of FIG. 1; and FIG. 5 illustrates the removal of the sheath to access a ballpoint pen in an alternate embodiment of a hand-held object holder made in accordance with the present invention.

DETAILED DESCRIPTION OF THE INVENTION

Figure 1:
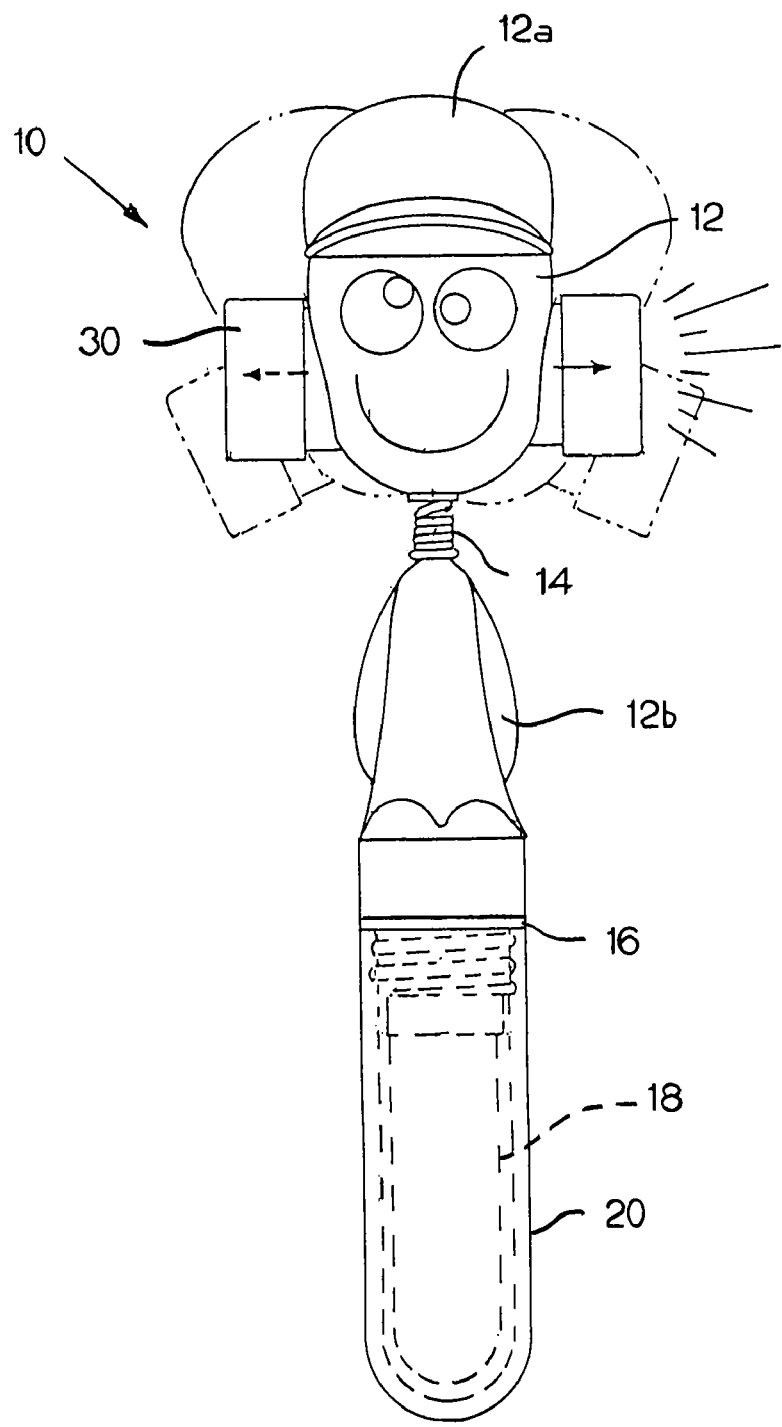
FIG. 1 is a view of an exemplary hand-held object holder made in accordance with the present invention.

The present invention is a hand-held object holder, a novelty product primarily for children.

FIGS. 1-4 are various views of an exemplary embodiment of a hand-held object holder (generally indicated by reference numeral 10) made in accordance with the present invention. The object holder 10 generally includes: an aesthetic component 12, with an upper portion 12a secured to a lower portion 12b by a spring 14; a coupling member 16 secured to and extending from the lower portion 12b of the aesthetic component 12 for securing an object 18 (e.g., a candy item) relative to the aesthetic component 12; and a sheath 20 that is selectively positioned over the object 18.

The aesthetic component 12 is intended to generate consumer appeal and attract the attention of children. Therefore, and as mentioned above, the aesthetic component 12 has an upper portion 12a secured to a lower portion 12b by a spring 14. There is no physical connection between the upper portion 12a and the lower portion 12b other than the spring 14, which is important to the movement of the upper portion 12a relative to the lower portion 12b, as is further described below. In this exemplary embodiment, the aesthetic component 12 is in the form of a "cartoonish" character, with the lower portion 12b taking the form of the body of the character, and the upper portion 12a taking the form of the head of the character. As such, the aesthetic component 12 is similar to a bobblehead doll, with the head of the character wobbling back and forth as the body is held and manipulated by an individual, as illustrated in FIG. 1.

Figure 2:
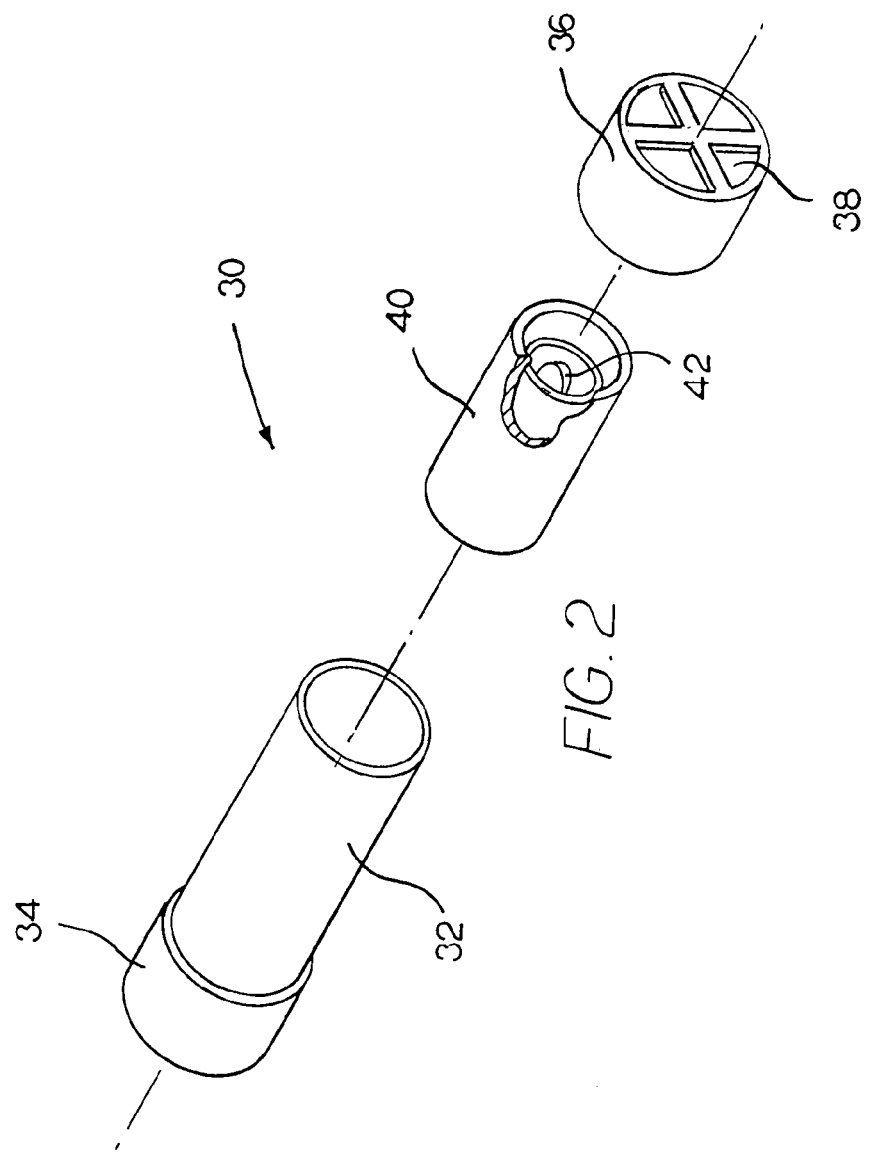
FIG. 2 is an exploded perspective view of the sound-making component of the exemplary hand-held object holder of FIG. 1.

Furthermore, secured to the aesthetic component 12 is a sound-generating component 30. In this exemplary embodiment, and as illustrated in FIG. 2, the sound-generating component 30 includes a hollow cylinder 32 with opposing end caps 34, 36. One of the end caps 34 is closed, while the other end cap 36 defines an opening 38 that allows air to enter into the interior of the cylinder 32 as the upper portion 12a of the aesthetic component 12 wobbles back and forth. A second cylindrical element 40, having an outer diameter slightly smaller than the inner diameter of the hollow cylinder 32, is positioned in the interior of the hollow cylinder 32 and slides along the length of the hollow cylinder 32 as the upper portion 12a of the aesthetic component 12 wobbles back and forth relative to the lower portion 12b. This second cylindrical element 40 carries a simple reed 42. The sliding of the second cylindrical element 40 along the length of the cylinder 32 causes the reed 42 to vibrate and generate sound.

Returning to FIG. 1, in this exemplary embodiment, the sound-generating component 30 passes through the upper portion 12a of the aesthetic component 12, with the end caps 34, 36 looking like exaggerated ears on the head of the character. In any event, with the upper portion 12a of the aesthetic component 12 wobbling back and forth as the lower portion 12b is held and manipulated by an individual, the sound-generating component 30 generates sound—a high-pitched "giggle" in this exemplary embodiment. Furthermore, with respect to such movement of the upper portion 12a relative to the lower portion 12b, Applicants have determined that if the spring 14 is connected to the upper portion 12a over approximately three-quarters of a revolution, as compared to a full revolution, there is an improved wobbling and sound-generating effect.

As an alternative to the mechanical sound-generating component described above, it is also contemplated that the sound-generating component could be comprised of an electronic sound chip and speaker without departing from the spirit and scope of the present invention. In such an alternate embodiment, the wobbling of the upper portion 12a of the aesthetic component 12 relative the lower portion 12b would intermittently close a switch or similarly activate the electronic sound chip and speaker to generates the desired sound.

Figure 3:
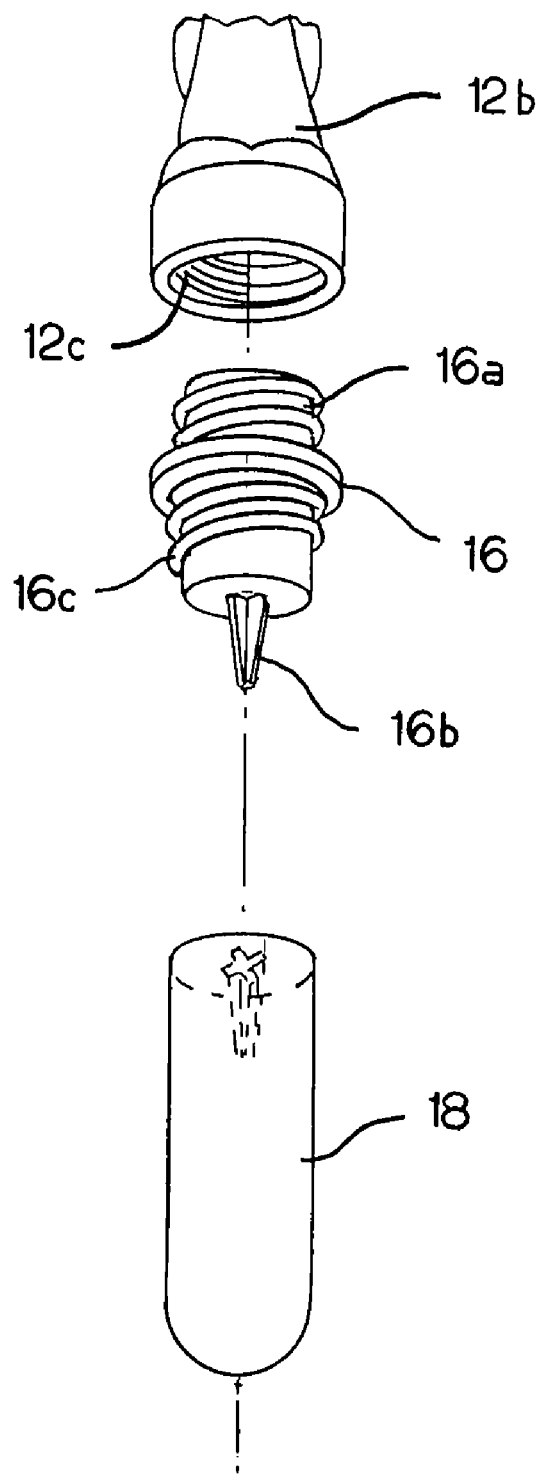
FIG. 3 is an exploded perspective view of the coupling member and candy item of the exemplary hand-held object holder of FIG. 1.

Referring now to FIG. 3, at the lower end of the aesthetic component 12, there is a coupling member 16 for securing an object 18 to the aesthetic component 12. Specifically, in this exemplary embodiment, the aesthetic component 12 defines a substantially circular cavity with internal threads 12c. The coupling member 16 is provided with corresponding external threads 16a, so that the coupling member 16 can be selectively secured to the aesthetic component 12 through engagement of the respective threads 12c, 16a.

Referring still to FIG. 3, in most cases, it is contemplated that the object 18 is a candy item 18. In this exemplary embodiment, the candy item 18 is a hard candy, similar to a lollipop, with a substantially cylindrical or "lipstick" shape. This candy item 18 is secured to and extends downwardly from the coupling member 16. In this regard, the candy item 18 may be molded around and to a shaft 16b that extends from the coupling member 16 along the axis of the candy item 18.

Furthermore, in this exemplary embodiment, and as best illustrated in FIG. 4, the hand-held object holder 10 includes a sheath 20 that is selectively positioned over the object 18. This is especially important when that the object 18 is a candy item as the sheath 20 fits over the candy item 18 to protect it from contaminants when it is not being consumed. In this exemplary embodiment, the coupling member 16 is provided with external threads 16c that correspond to internal threads 20a defined by the sheath 20. Accordingly, the sheath 20 can be selectively attached to the coupling member 16 through engagement of the respective threads 16c, 20a.

As a further refinement, although not shown in the Figures, an adhesive label may be placed over and around a portion of the aesthetic component 12, the coupling member 16, and a portion of the sheath 20, temporarily sealing the sheath 20 and preventing access to the object 18 until the hand-held object holder 10 is delivered to a consumer, at which time the seal can be broken.

Finally, FIG. 5 illustrates an alternate embodiment in which a ballpoint pen 18b is secured to the aesthetic component 12. It is further contemplated that a candy item, ballpoint pen, and/or additional items could be packaged together as part of the hand-held object holder 10 to allow for selective detachment and attachment of each object. For example, when the candy item is finished, it could be replaced by the ballpoint pen.

One of ordinary skill in the art will also recognize that additional embodiments are possible without departing from the teachings of the present invention or the scope of the claims which follow. This detailed description, and particularly the specific details of the exemplary embodiments disclosed therein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A hand-held object holder, comprising:
an aesthetic component with an upper portion secured to a lower portion by a spring, such that the upper portion can wobble back and forth relative to the lower portion;
a coupling member secured to and extending from the lower portion of said aesthetic component for securing an object relative to said aesthetic component; and
a sound-generating component activated by the wobbling of the upper portion of said aesthetic component back and forth relative to the lower portion said sound-generating component including
a hollow cylinder with opposing end caps, with one of said end caps defining an opening that allows air to enter into the interior of the cylinder as the upper portion of said aesthetic component wobbles back and forth relative to the lower portion, and
a second cylindrical element having an outer diameter slightly smaller than the inner diameter of said hollow cylinder, said second cylindrical element positioned in the interior of said hollow cylinder and sliding along the length of said hollow cylinder as the upper portion of said aesthetic component wobbles back and forth relative to the lower portion, wherein said second cylindrical element carries a reed, such that the sliding of said second cylindrical element along the length of the hollow cylinder causes said reed to vibrate and generate sound.

2. The hand-held object holder as recited in claim 1, wherein said coupling member is adapted to secure a candy item relative to said aesthetic component.

3. The hand-held object holder as recited in claim 2, wherein the candy item is molded to and around a shaft that extends from said coupling member.

4. The hand-held object holder as recited in claim 2, and further comprising a sheath that is selectively positioned over the candy item.

5. The hand-held object holder as recited in claim 1, wherein said aesthetic component is in the form of a character, with the lower portion taking the form of a body of the character, and the upper portion taking the form of a head of the character.

6. The hand-held object holder as recited in claim 1, wherein said aesthetic component defines a substantially circular cavity with internal threads, and wherein said coupling member has corresponding external threads so that said coupling member can be selectively secured to said aesthetic component through engagement of the respective threads.

7. A hand-held object holder, comprising:
an aesthetic component with an upper portion secured to a lower portion by a spring, such that the upper portion can wobble back and forth relative to the lower portion;
a coupling member secured to and extending from the lower portion of said aesthetic component for securing an object relative to said aesthetic component; and
a sound-generating component having a reed, with the wobbling of the upper portion of said aesthetic component back and forth relative to the lower portion causing said reed to vibrate and generate sound.

8. The hand-held object holder as recited in claim 7, wherein said sound-generating component comprises:
a hollow cylinder with opposing end caps, with one of said end caps defining an opening that allows air to enter into the interior of the cylinder as the upper portion of said aesthetic component wobbles back and forth relative to the lower portion; and
a second cylindrical element having an outer diameter slightly smaller than the inner diameter of said hollow cylinder, said second cylindrical element positioned in the interior of said hollow cylinder and sliding along the length of said hollow cylinder as the upper portion of said aesthetic component wobbles back and forth relative to the lower portion, wherein said second cylindrical element carries the reed, such that the sliding of said second cylindrical element along the length of the hollow cylinder causes said reed to vibrate and generate sound.

9. The hand-held object holder as recited in claim 7, wherein said coupling member is adapted to secure a candy item relative to said aesthetic component.

10. The hand-held object holder as recited in claim 9, wherein the candy item is molded to and around a shaft that extends from said coupling member.

11. The hand-held object holder as recited in claim 9, and further comprising a sheath that is selectively positioned over the candy item.

12. The hand-held object holder as recited in claim 7, wherein said aesthetic component is in the form of a character, with the lower portion taking the form of a body of the character, and the upper portion taking the form of a head of the character.

* * * * *

UNITED STATES PATENT AND TRADEMARK OFFICE
CERTIFICATE OF CORRECTION

| | | |
|---|---|---|
| PATENT NO. | : 7,473,155 B1 | Page 1 of 1 |
| APPLICATION NO. | : 11/458133 | |
| DATED | : January 6, 2009 | |
| INVENTOR(S) | : Klundt et al. | |

It is certified that error appears in the above-identified patent and that said Letters Patent is hereby corrected as shown below:

IN THE CLAIMS:

Claim 1, col. 3, line 48: Add a comma after the word "portion"

Signed and Sealed this

Seventeenth Day of February, 2009

JOHN DOLL
*Acting Director of the United States Patent and Trademark Office*